(12) United States Patent
Oshima et al.

(10) Patent No.: US 8,687,067 B2
(45) Date of Patent: Apr. 1, 2014

(54) CAMERA DEVICE, CAMERA SYSTEM AND CAMERA CALIBRATION METHOD

(75) Inventors: Takeo Oshima, Yokohama (JP); Takashi Maekawa, Setagaya-ku (JP); Ryuuichi Sawada, Setagaya-ku (JP); Haruo Yanagisawa, Setagaya-ku (JP); Chinatsu Sakurai, Setagaya-ku (JP); Akinori Iwabuchi, Setagaya-ku (JP); Shinya Tamizu, Setagaya-ku (JP); Takashi Inoue, Setagaya-ku (JP)

(73) Assignee: KYOCERA Corporation, Kyoto (JP)

( * ) Notice: Subject to any disclaimer, the term of this patent is extended or adjusted under 35 U.S.C. 154(b) by 61 days.

(21) Appl. No.: 13/542,960

(22) Filed: Jul. 6, 2012

(65) Prior Publication Data
US 2013/0222607 A1 Aug. 29, 2013

(30) Foreign Application Priority Data
Feb. 24, 2012 (JP) ................................ 2012-039416

(51) Int. Cl.
*H04N 17/00* (2006.01)
*H04N 7/18* (2006.01)

(52) U.S. Cl.
USPC .......................................... 348/187; 348/148

(58) Field of Classification Search
USPC ......... 348/188, 187, 208.3, 208.99, 142, 143, 348/148; 725/12, 75; 702/85, 94, 108, 127, 702/150
IPC ......................... H04N 17/00,17/02, 5/228, 7/18
See application file for complete search history.

(56) References Cited

U.S. PATENT DOCUMENTS 8,248,471 B2 * 8/2012 Inui et al. ...................... 348/187

FOREIGN PATENT DOCUMENTS

JP         10-181447 A      7/1998
JP         2000-209577 A    7/2000

* cited by examiner

*Primary Examiner* — Sherrie Hsia
(74) *Attorney, Agent, or Firm* — Studebaker & Brackett PC

(57) ABSTRACT

An object of the present invention is to simplify a calibration operation of a camera and to shorten a time necessary for calibration. A camera calibration device 10 is mounted on a predetermined position of a movable object 100 and includes a camera 11 configured to take an image including an index 41 provided outside the movable object 100, an image superimposing unit 122 configured to generate a superimposed image by superimposing a calibration object 42 having a position adjustment part and a rotation adjustment part on the image taken by the camera 11, and a calculation unit 124 configured to calculate, based on a position of the calibration object 42 after being shifted in the superimposed image such that an end or a center of the index 41 meets the position adjustment part and a part of the index other than the end or the center overlaps the rotation adjustment part, parameters relative to a pan angle, a tilt angle and a roll angle for calibration of the camera mounting position.

15 Claims, 11 Drawing Sheets

CAMERA DEVICE, CAMERA SYSTEM AND CAMERA CALIBRATION METHOD

CROSS REFERENCE TO RELATED APPLICATION

This application claims priority to and the benefit of Japanese Patent Application No. 2012-039416 filed on Feb. 24, 2012, the entire contents of which are incorporated herein by reference.

FIELD OF THE INVENTION

The present invention relates to a camera device, a camera system and a camera calibration method for calibration of an angle of a camera mounted on a movable object.

BACKGROUND OF THE INVENTION

There is known a camera system that enables, by using a camera mounted on a rear side of a vehicle, to display an image behind the vehicle, where it is hard for a driver to view, on a display unit inside the vehicle. For such a system, there is known a method, by adjusting a difference between an assumed image capturing a subject whose position information is known and an actual image of the subject actually taken by the camera, to obtain parameters for calibration of a camera mounting position (for example, see Patent Document 1 and Patent Document 2).

RELATED ART DOCUMENTS

Patent Documents

Patent Document 1: Japanese Patent Laid-Open No. 2000-209577
Patent Document 2: Japanese Patent Laid-Open No. 10-181447

SUMMARY OF THE INVENTION

In obtaining the parameters for calibration of the camera mounting position, in order to adjust the difference between the assumed image and the actual image, it is necessary to shift the assumed image to overlap the actual image. However, there has been a problem that, because of a time lag between an instruction by a user to shift the assumed image and the shift of the assumed image, a calibration operation takes time when there are a plurality of instructions to shift the assumed image in vertical, horizontal and rotational directions.

Accordingly, it is an object of the present invention, in consideration of such a problem, to provide a camera device, a camera system and a camera calibration method that may simplify a calibration operation of the camera and shorten a time necessary for calibration.

In order to solve the above problem, a camera device according to one embodiment includes: a camera mounted on a predetermined position of a movable object and configured to take an image including an index provided outside the movable object; an image superimposing unit configured to generate a superimposed image by superimposing a calibration object having a position adjustment part and a rotation adjustment part on the image taken by the camera; and a calculation unit configured to calculate, based on a position of the calibration object after being shifted in the superimposed image such that an end or a center of the index meets the position adjustment part and a part of the index other than the end or the center overlaps the rotation adjustment part, parameters relative to a pan angle, a tilt angle and a roll angle for calibration of a camera mounting position.

The camera device according to one embodiment, wherein the calculation unit, when an instruction to shift the calibration object in horizontal, vertical and rotational directions is detected, shifts a display position of the calibration object on the superimposed image according to the instruction.

The camera device according to one embodiment, wherein the position adjustment part has a circular shape.

The camera device according to one embodiment, wherein the rotation adjustment part includes a plurality of parallel lines adjacent to the position adjustment part.

The camera device according to one embodiment, wherein the calculation unit controls to display the image taken by the camera at least when a parking mode is selected and when a camera calibration mode is selected.

The camera device according to one embodiment, wherein the calculation unit, when the camera calibration mode is selected, controls the image superimposing unit to superimpose the calibration object on the image taken by the camera.

The camera device according to one embodiment, wherein the calculation unit, when the parking mode is selected, controls the image superimposing unit to superimpose a predicted track of the movable object on the image taken by the camera.

The camera device according to one embodiment, wherein a marker is provided on the center of the index and the calibration object is shifted such that the position adjustment part meets the marker.

A camera device according to one embodiment includes: a camera mounted on a predetermined position of a movable object and configured to take an image including an index provided outside the movable object; an image superimposing unit configured to generate a superimposed image by superimposing a calibration object having calibrations for a rough indication of a shift amount on the image taken by the camera; and a calculation unit configured to calculate, based on a position of the calibration object after being shifted in the superimposed image such that the index and all or a part of the calibration object roughly overlap with each other, parameters relative to a pan angle, a tilt angle and a roll angle for calibration of a camera mounting position.

The camera device according to one embodiment, wherein intervals of the calibrations of the calibration object correspond to a shift amount by predetermined times of operations to shift the calibration object.

A camera device according to one embodiment includes: a camera mounted on a predetermined position of a movable object and configured to take an image including an index provided outside the movable object; an image superimposing unit configured to generate a superimposed image by superimposing a calibration object having one end adjustment part and the other end adjustment part having markers in a predetermined width on the image taken by the camera; and a calculation unit configured to calculate, based on a position of the calibration object after being shifted in the superimposed image such that one end and the other end of the index respectively fit in the predetermined width of the marker of the one end adjustment part and the other end adjustment part, parameters relative to a pan angle, a tilt angle and a roll angle for calibration of a camera mounting position.

A camera device according to one embodiment includes: a camera mounted on a predetermined position of a movable object and configured to take an image including an index provided outside the movable object; an image superimposing unit configured to generate a superimposed image by superimposing a calibration object having both end adjustment parts and calibrations for adjusting a rotation axis on the image taken by the camera; and a calculation unit configured to calculate, based on a position of the calibration object after being shifted in the superimposed image such that, after the index and the calibrations become roughly parallel to one another, each end of the index roughly meets the respective both end adjustment parts, parameters relative to a pan angle, a tilt angle and a roll angle for calibration of a camera mounting position.

A camera device according to one embodiment includes: a camera mounted on a predetermined position of a movable object and configured to take an image including an index provided outside the movable object; an image superimposing unit configured to generate a superimposed image by superimposing a calibration object having an upper line, a lower line, a left line and a right line on the image taken by the camera; and a calculation unit configured to calculate, based on a position of the calibration object when the upper line, the lower line, the left line and the right line are separately shifted such that the index fits in an area surrounded by the upper line, the lower line, the left line and the right line, parameters relative to a pan angle, a tilt angle and a roll angle for calibration of a camera mounting position.

Moreover, in order to solve the above problem, a camera calibration method according to one embodiment includes: a step to take an image including an index provided outside a movable object by a camera mounted on a predetermined position of the movable object; a step to generate a superimposed image by superimposing a calibration object having a position adjustment part and a rotation adjustment part on the image taken by the camera; and a step to calculate, based on a position of the calibration object after being shifted in the superimposed image such that an end or a center of the index meets the position adjustment part and a part other than the end or the center of the index overlaps the rotation adjustment part, parameters relative to a pan angle, a tilt angle and a roll angle for calibration of a camera mounting position.

Further, in order to solve the above problem, a camera system according to one embodiment includes: a camera mounted on a predetermined position of a movable object and configured to take an image including an index provided outside the movable object; an image superimposing unit configured to generate a superimposed image by superimposing a calibration object having a position adjustment part and a rotation adjustment part on the image taken by the camera; a display unit provided inside the movable object and configured to display the superimposed image; an instruction unit configured to instruct the calibration object to shift a display position of the calibration object on the superimposed image; and a calculation unit configured to calculate, based on the position of the calibration object when an end or a center of the index meets the position adjustment part and a part other than the end or the center of the index overlaps the rotation adjustment part, parameters relative to a pan angle, a tilt angle and a roll angle for calibration of a camera mounting position.

According to the embodiments, a calibration operation of the camera is simplified and a time necessary for the calibration is shortened.

DETAILED DESCRIPTION OF EMBODIMENTS OF THE INVENTION

Embodiments of the present invention will be described with reference to the accompanying drawings.

Figure 1:
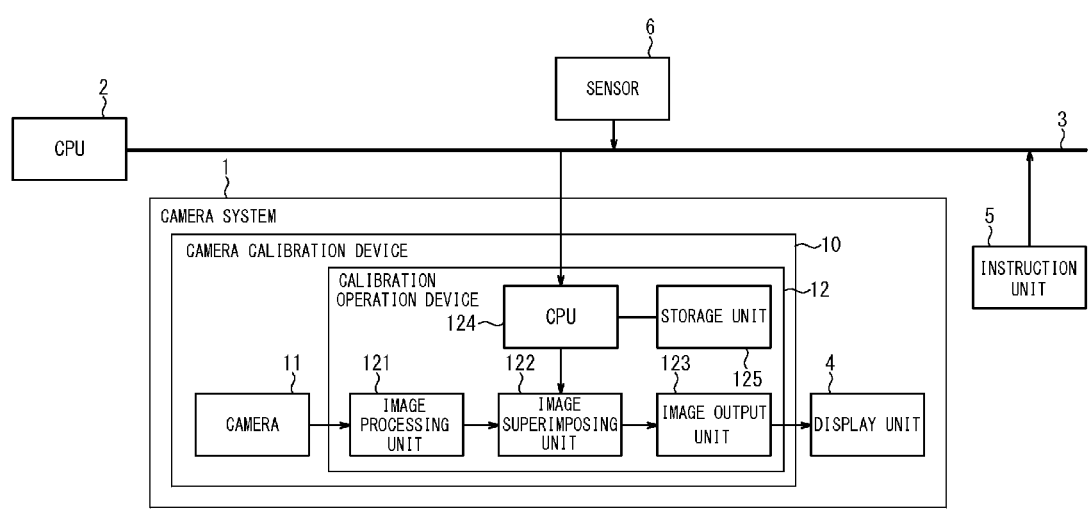
FIG. 1 is a block diagram illustrating an example of a configuration of a system mounting a camera system according to one embodiment of the present invention.

FIG. 1 is a block diagram illustrating an example of a configuration of a system when a camera system according to the embodiment of the present invention is mounted on a movable object (for example, a vehicle). As illustrate in FIG. 1, the system mounted on the movable object includes a camera system 1, a CPU 2 for controlling the entire system, a bus 3, an instruction unit 5 and a sensor 6. The camera system 1 includes a camera calibration device (camera device) 10 and a display unit 4. The camera calibration device 10 includes a camera 11 and a calibration operation device 12. The calibration operation device 12 includes an image processing unit 121, an image superimposing unit 122, an image output unit 123, a CPU 124 and a storage unit 125.

The camera 11 has an image sensor such as CMOS or CCD for converting the light of a subject entering through a lens into an electric signal and generating an image of the subject.

Figure 17:
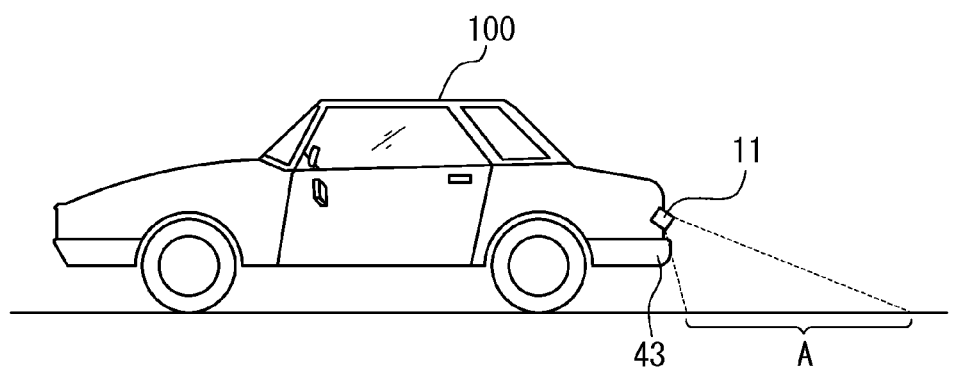
FIG. 17 is a diagram illustrating a movable object having the camera mounted thereon.

The camera 11 is mounted on a predetermined position of the movable object. FIG. 17 is a diagram illustrating the movable object having the camera 11 mounted thereon. According to the present embodiment, as illustrated in FIG. 17, the camera 11 is mounted near a bumper 44 on the rear side of a movable object 100 to take an image behind the movable object 100. An area A in the figure represents an area captured by the camera 11.

The display unit 4, when a user selects a parking mode, displays an image generated by the camera system 1. The parking mode assists smooth parking by displaying, on the display unit 4, an image in the area A behind the movable object 100, where it is difficult for the user driving the movable object 100 to view. A predicted track of the movable object 100 may be superimposed on the image in the area A behind the movable object 100, for assisting smoother parking.

Also, when a camera calibration mode is selected by the user, the image generated by the camera system 1 is displayed. The camera calibration mode, by disposing an indicative subject or figure in the area A behind the movable object 100, allows the user to calibrate a mounting position of the camera 11 by using an image of an index taken by the camera 11. The camera calibration mode is used when the camera 11 is mounted on the movable object 100 in a production line of the movable object 100 or when the camera 11 is displaced due to vibrations of the movable object 100. A detailed calibration method will be described below.

When a navigation mode is selected by the user, the display unit 4 may display a route map to a destination obtained by a navigation system. When a TV mode is selected, the display unit 4 may display television obtained by a TV receiver.

The instruction unit 5 serves as a user interface for adjustment of a position of the calibration object superimposed in the display unit 4. The instruction unit 5 may be operated to shift the calibration object in vertical, horizontal and rotational directions. The instruction unit 5 outputs an object shift signal obtained by an operation by the user to the CPU 124 via the bus 3. When an adjustment operation ends, the instruction unit 5 outputs an adjustment end signal to the CPU 124 via the bus 3.

The sensor 6 includes a speed sensor for detecting a moving speed of the vehicle, a gear sensor for detecting a position of a gear lever, and a steering angle sensor for detecting a steering angle. The sensor 6 outputs a sensor signal obtained from each sensor to the CPU 124 and the CPU 2 via the bus 3.

The storage unit 125 stores a position coordinate of the camera 11 and a position coordinate of the index as known values.

The CPU 124 determines a display position of the calibration object based on the object shift signal obtained from the instruction unit 5 and instructs the image superimposing unit 122 to generate a superimposed image. Also, the CPU 124, upon receiving a calibration end instruction from the instruction unit 5, obtains the position coordinate of the calibration object at the end of the calibration and the position coordinates of the camera 11 and the index stored in the storage unit 125, and then calculates, based on the position coordinates, calibration parameters (a pan angle, a tilt angle and a roll angle) for calibration of the mounting position of the camera 11. Moreover, the CPU 124 determines a display position of the predicted track of the movable object 100 based on the sensor signal obtained from the sensor 6 and instructs the image superimposing unit 122 to generate the superimposed image.

The image processing unit 121 generates a digital image by performing A/D conversion, noise reduction processing and image processing to the image taken by the camera 11 and outputs the digital image to the image superimposing unit 122.

The image superimposing unit 122, based on the instruction by the CPU 124, generates the superimposed image by superimposing an image on a predetermined position of the digital image generated by the image processing unit 121 and outputs the superimposed image to the image output unit 123. The image to be superimposed is the calibration object used for calibration of the mounting position of the camera 11 or the predicted track to be followed by the movable object 100 moving backward, for assisting parking.

The image output unit 123 converts the superimposed image generated by the image superimposing unit 122 into a format (for example, NTSC) appropriate for a display device of the display unit 4 and outputs the converted superimposed image to the display unit 4.

Figure 2:
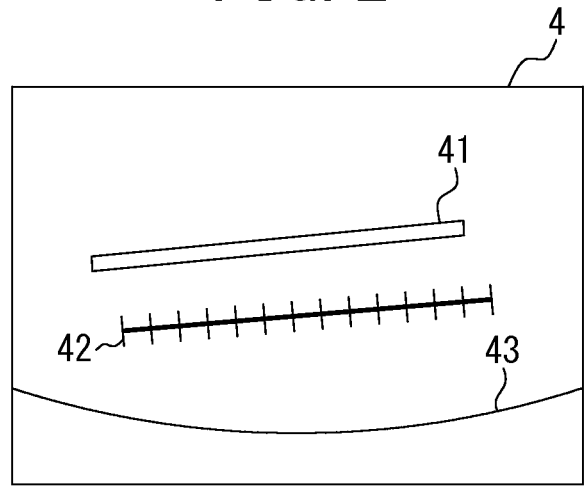
FIG. 2 is a block diagram illustrating an example of an image displayed on a display unit of the camera system according to one embodiment of the present invention.
Figure 12:
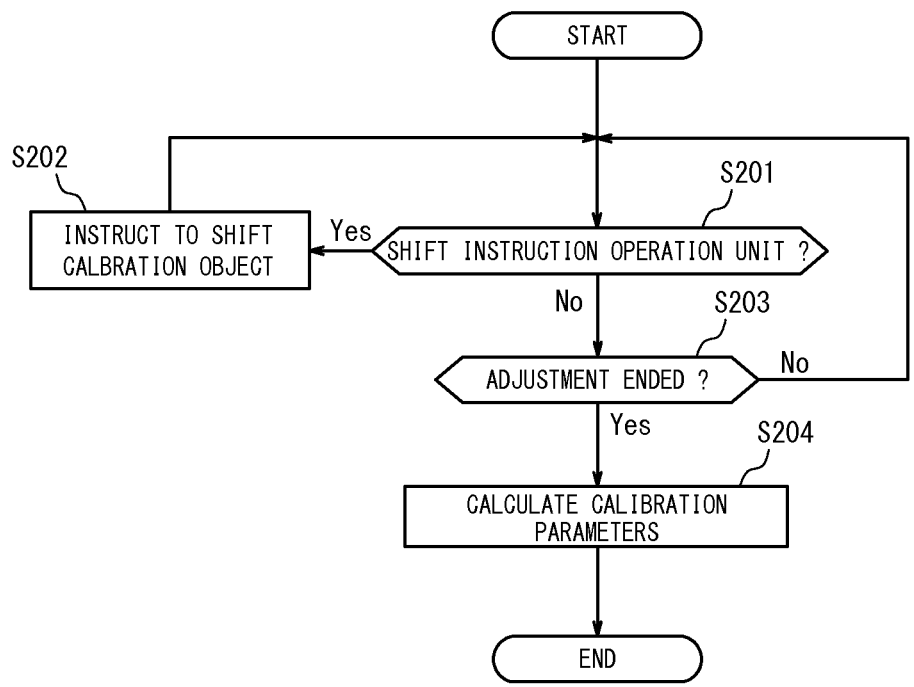
FIG. 12 is a flowchart illustrating an operation of a CPU in calibration operation of the camera by the camera system according to one embodiment of the present invention.

FIG. 2 is a diagram illustrating an example of an image displayed on the display unit 4 when the user selects the parking mode. The display unit 4 displays an index 41 and a calibration object 42. When the camera 11 is mounted near the bumper 43 as illustrated in FIG. 12, an edge of the bumper 43 is also displayed.

The index 41 is a subject or figure disposed at a predetermined distance (for example, 1 m) from a rear end of the movable object 100 when the movable object 100 is accurately stopped at a predetermined parking position, and takes the shape of, for example, a rectangular plate or a white line drawn on a road. That is, when the camera 11 is mounted on a correct angle, a positional relationship between the movable object 100 and the index 41 is specified, thus the index 41 taken by the camera 11 is always displayed at a specific position on the image displayed on the display unit 4. When the index 41 is displayed off the specific position, the instruction unit 5 may issue an instruction to shift the calibration object 42 to the index 41. Thereby, the calibration parameters for specifying deviation of a mounting angle of the camera 11 may be obtained.

Figure 3:
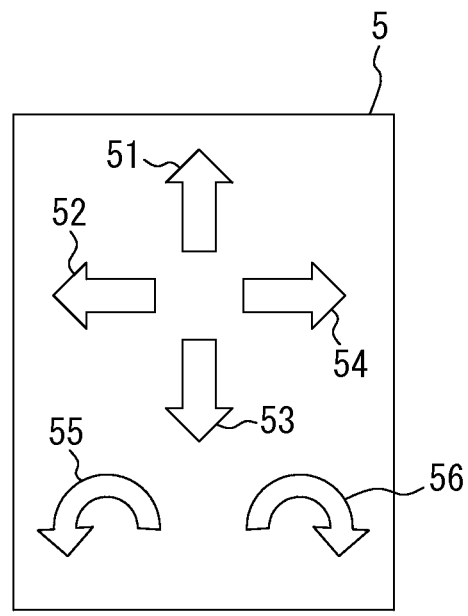
FIG. 3 is a block diagram illustrating an example of an outline view of an instruction unit of the camera system according to one embodiment of the present invention.

FIG. 3 is a diagram illustrating an example of an outline view of the instruction unit 5. As illustrated in FIG. 2, the instruction unit 5 includes an upward instruction unit 51, a left instruction unit 52, a downward instruction unit 53, a right instruction unit 54, a counterclockwise rotation unit 55 and a clockwise rotation unit 56, which may be mechanical switches provided near the display unit 4 inside the vehicle or objects displayed on a touch panel laminated on the display unit 4. The upward instruction unit 51 is used to shift the calibration object 42 upward and the left instruction unit 52 is used to shift the calibration object 42 in the left direction. The downward instruction unit 53 is used to shift the calibration object 42 downward and the right instruction unit 54 is used to shift the calibration object 42 in the right direction. The counterclockwise rotation instruction unit 55 is used to rotate the calibration object 42 counterclockwise and the clockwise rotation instruction unit 56 is used to rotate the calibration object 42 clockwise.

Here, when a single pressing of the left instruction unit 52 or the right instruction unit 54 is made correspond to 0.5 degrees offset, the calibration object 42, upon a single pressing of the left instruction unit 52 or the right instruction unit 54, is shifted by the number of pixels equivalent to a shift amount of the image when an image taking direction of the camera 11 is directed by 0.5 degrees in a pan (horizontal) direction. The same applies to the vertical (tilt) direction and a roll (rotational) direction.

Figure 4:
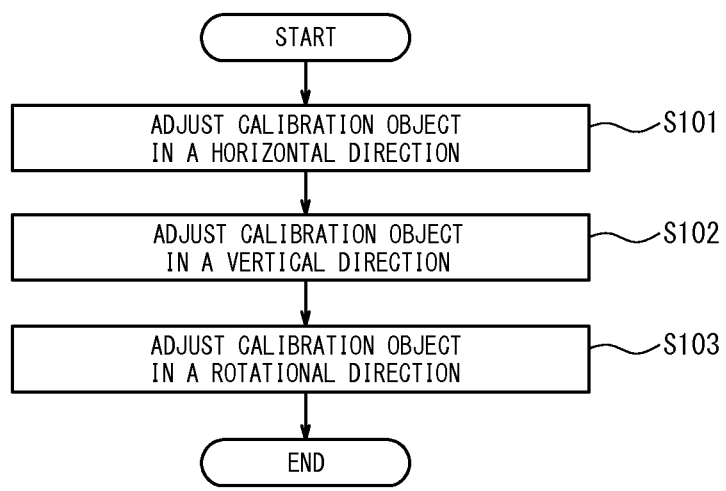
FIG. 4 is a flowchart illustrating a calibration operation of a camera by the camera system according to one embodiment of the present invention.
Figure 5:
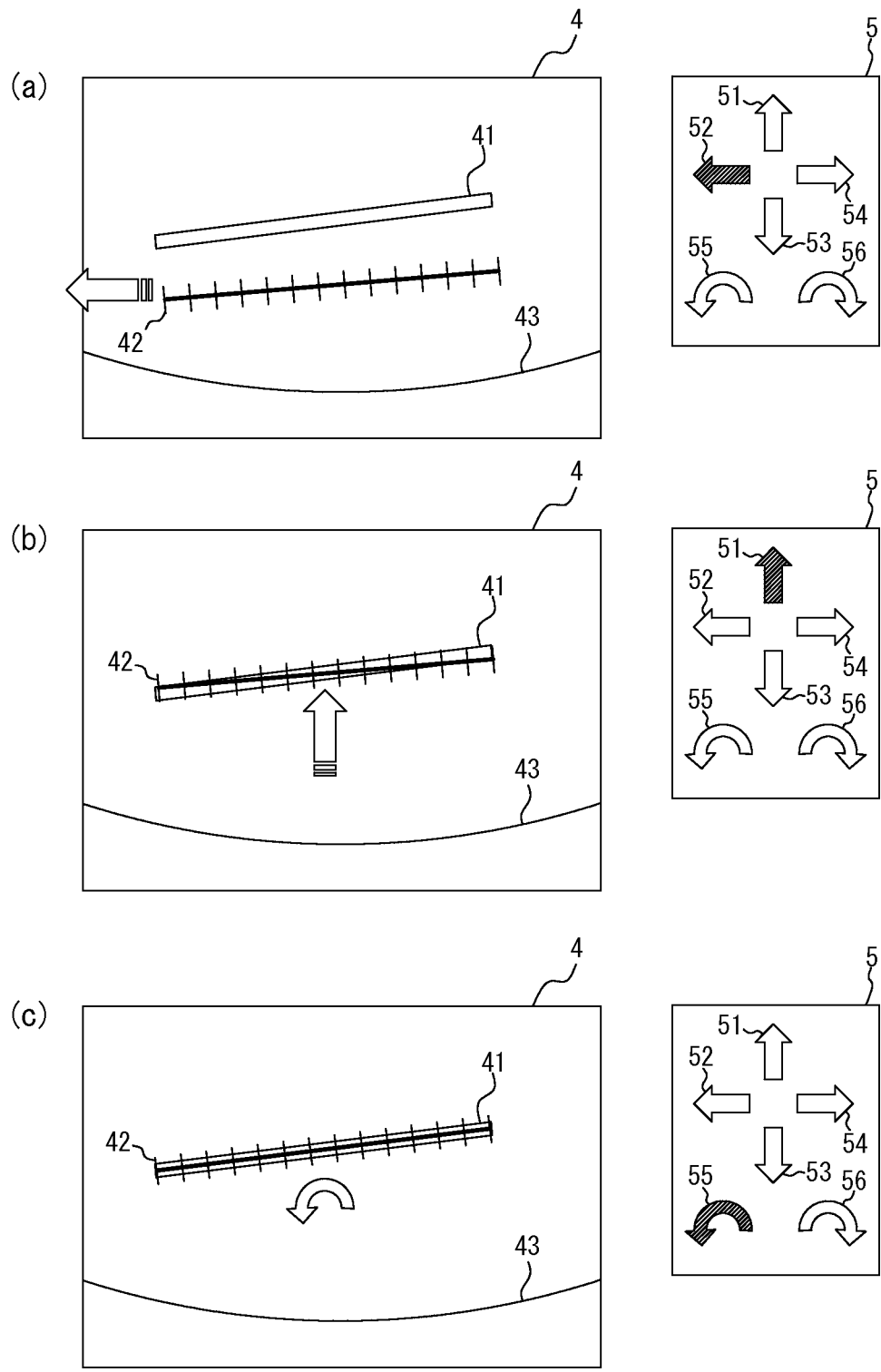
FIG. 5(a)-(c) are diagrams illustrating images displayed on the display unit in calibration operation of the camera by the camera system according to one embodiment of the present invention.

Next, a calibration operation of the camera by the camera system 1 will be described. FIG. 4 is a flowchart illustrating the calibration operation of the camera by the camera system 1. FIG. 5 is a diagram illustrating images displayed on the display unit 4 in calibration operation of the camera.

The user shifts the calibration object 42 in the vertical or horizontal direction such that left and right sides of the calibration object 42 align the index 41 (step S101). FIG. 5(a) illustrates a state when the left instruction unit 52 is pressed down and the calibration object 42 is shifted in the left direction.

Next, the user shifts the calibration object 42 in the vertical direction such that top and bottom of the calibration object 42 meets the index 41 (step S102). FIG. 5(b) illustrates a state when the upward instruction unit 51 is pressed down and the calibration object 42 is shifted upward.

Then, the user shifts the calibration object 42 in a rotational direction such that the calibration object 42 overlaps the index 41 in the rotational direction (step S102). FIG. 5(c) illustrates a state when the counterclockwise rotation instruction unit 55 is pressed down and the calibration object 42 rotates counterclockwise.

The calibration object 42 illustrated in FIGS. 2 and 5 has calibrations at regular intervals. The calibrations indicate an approximate shift amount and the intervals of the calibrations correspond to a predetermined number of shift operations of the calibration object. For example, the intervals of the calibrations are defined as a moving distance when the left instruction unit 52 or the right instruction unit 54 is pressed down five times. The calibrations allow the user to obtain an approximate shift amount of the calibration object 42. For example, when the calibration object 42 is displaced relative to the index 41 by one calibration in the right direction, the user may shift the calibration object 42 at once by one calibration in the left direction by continuously pressing down the left instruction unit 52 five times. After the user makes the instruction unit 5 issue a shift instruction and before the calibration object 42 is shifted in the display unit 4, it takes some time as it is necessary to wait for the signal to be transmitted to the CPU 124 via the bus 3 and for a display on the display unit 4 to be updated upon completion of various image processing by the CPU 124. However, when the calibrations of the calibration object 42 are used, the number of times to press the instruction unit 5 may be estimated without waiting for the display to be updated. Therefore, the user may instruct the number of times to press based on estimation without waiting for the update of the display and thus may quickly shift the calibration object as intended. As a result, the operation time may be shortened. The same applies not only in the horizontal (pan) direction but also the vertical (tilt) direction and the rotational (roll) direction. Examples are illustrated in a part of FIG. 6.

Figure 6:
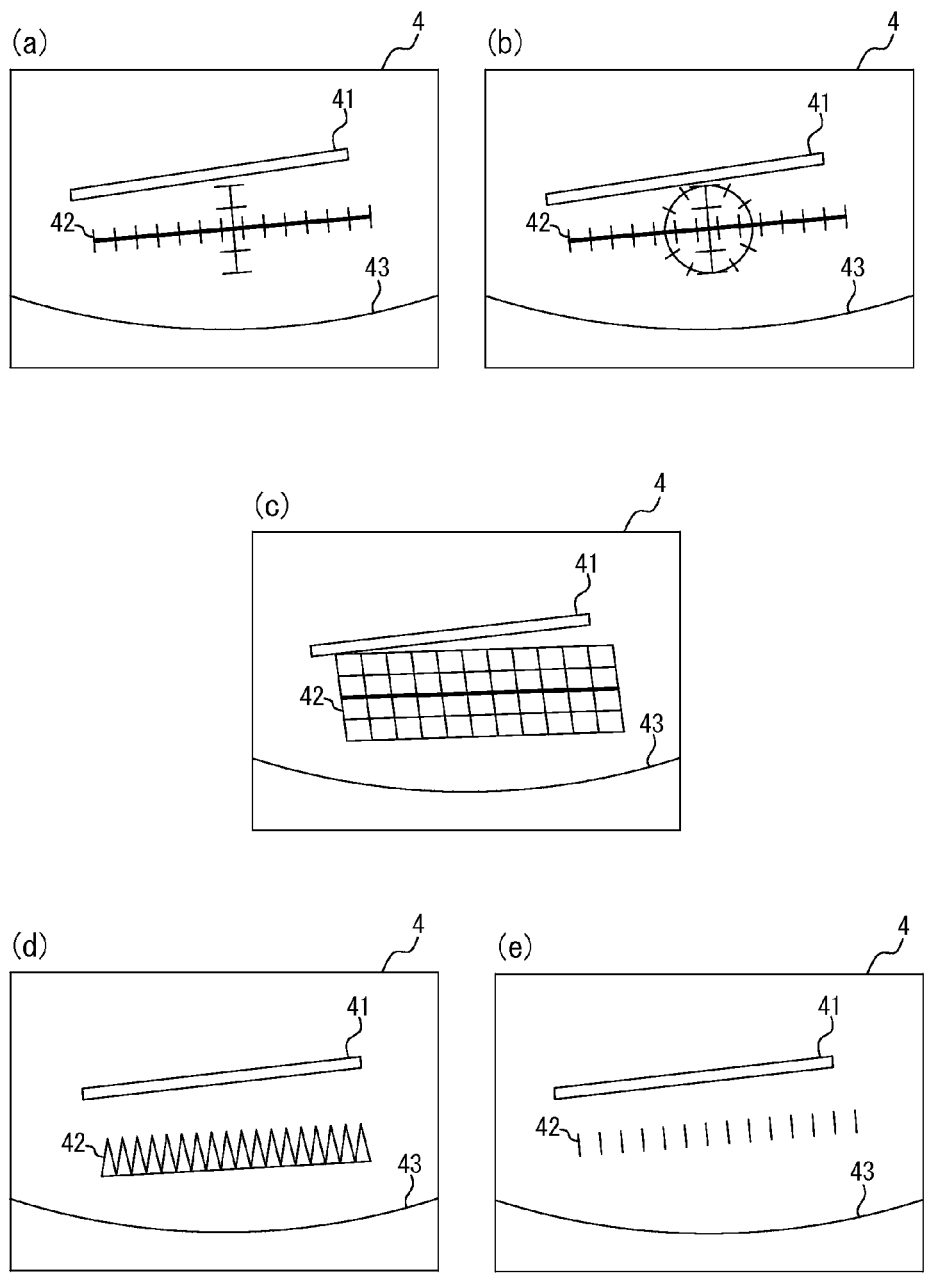
FIG. 6(a)-(e) are diagrams illustrating examples of a calibration object having calibrations.

FIG. 6 is a diagram illustrating other examples of the calibration object 42 having the calibrations. In FIG. 6(a), the calibrations are provided in an approximately vertical direction and an approximately horizontal direction in a part (main part) of the calibration object 42 having no calibrations. This allows the user to obtain an approximate shift amount of the calibration object 42 in the vertical and horizontal directions.

In FIG. 6(b), in addition to the horizontal and vertical directions, the calibrations are provided in the rotational direction at the main part. This allows the user to obtain an approximate shift amount of the calibration object 42 in the rotational direction as well as in the vertical and horizontal directions. As illustrated in FIG. 6(c), grid calibrations may be provided at the main part. The calibrations are not limited to lines but may be notched as illustrated in FIG. 6(d), for example. Or, as illustrated in FIG. 6(e), the calibration object 42 may have only steps. In this case, a distance between a leftmost step and a rightmost step is equal to a length of the index 41.

Figure 7:
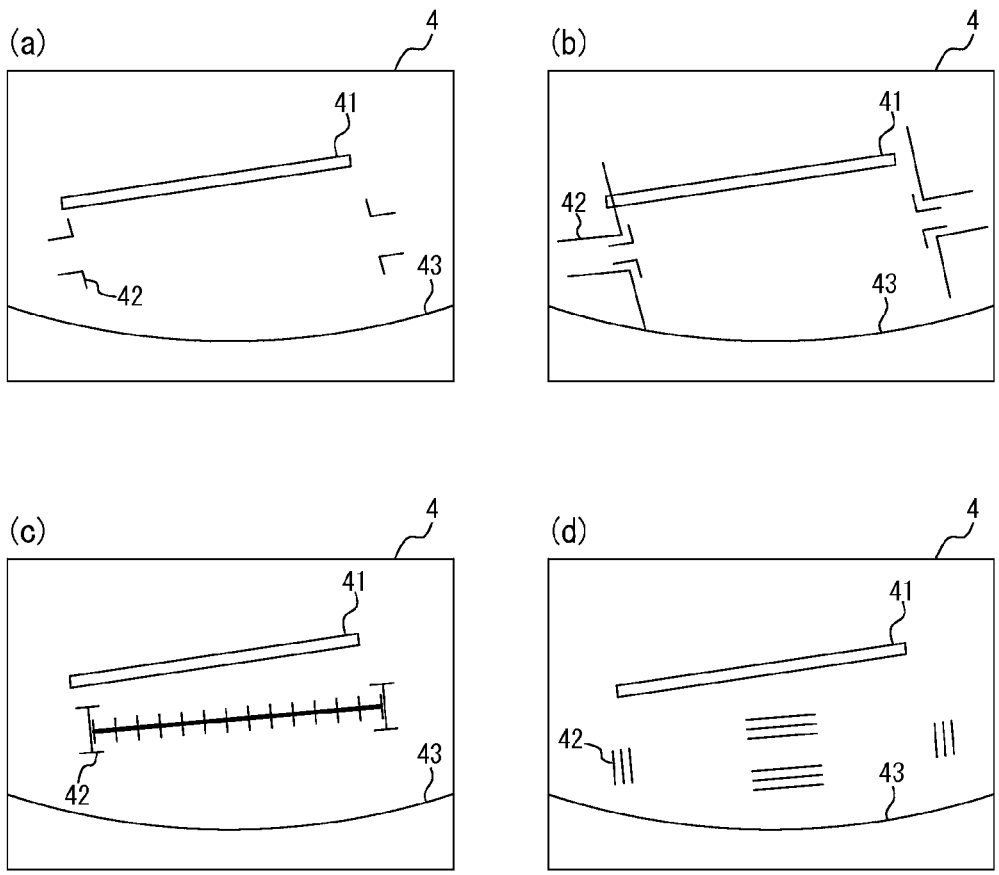
FIG. 7(a)-(d) are diagrams illustrating examples of a calibration object having one end adjustment part and the other end adjustment part with markers in a predetermined width.

FIG. 7 is a diagram illustrating examples of the calibration object 42 having one end adjustment part and the other end adjustment part having markers with a predetermined width. In FIGS. 7(b) and (b), the markers indicate that the calibration object 42 may be shift until one end and the other end of the index 41 fit in the predetermined width between the markers of the one end adjustment part and the other end adjustment part. Especially in a case illustrated in FIG. 7(b), four large corner-shaped markers and four small corner-shaped markers are provided to allow for a rough positioning relative to the index 41 by using the large corner-shaped markers and then an accurate positioning by using the small corner-shaped markers; that is, to allow for a two-step calibration that enables quick and highly accurate positioning relative to the index 41.

Needless to say, the markers, as illustrated in FIG. 7(c), may be provided at both ends of the calibration object 42 having the calibrations. In this case, the calibration object 42 is given some width in a short direction thereof. Therefore, when the calibration object 42 is largely displaced from the index 41, the calibration object 42 may be roughly positioned relative to the index 41 by referring to the width in the short direction. Thereby, in this case also, the calibration object 42 may be positioned quickly and accurately relative to the index 41.

As illustrated in FIG. 7(d), the number of markers may be increased to have multiple markers such as four markers, each of which includes an outer line, a middle line and an inner line, such that the calibration object 42 is shifted to fit in an area surrounded by the markers. In this case illustrated in FIG. 7(d), the outermost four markers allow for a rough positioning and the inner markers allow for more accurate positioning. Therefore, the calibration object 42 may be positioned quickly and accurately even when the calibration object 42 is largely displaced.

Although the calibration parameter may be calculated when the calibration object 42 shifted toward the index 41 does not completely overlap the index 41, there has been no method to allow for the user to know by how much error the calculation of the calibration parameter is not affected. Therefore, the width of the marker indicates a margin for error. However, by using the calibration object 42 having the markers illustrated in FIG. 7, the operation may end when the one end and the other end of the index 41 fit between the one end adjustment part and the other end adjustment part of the marker having the predetermined width therebetween. Thereby, the time for adjustment may be shortened.

Figure 8:
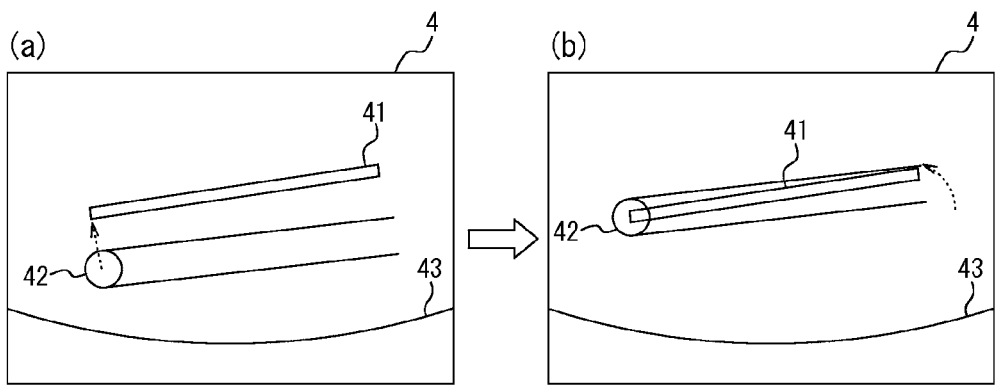
FIGS. 8(a) and (b) are diagrams illustrating an example of a calibration object having the one adjustment part and a rotation adjustment part.

FIG. 8 is a diagram illustrating an example of the calibration object 42 having the one end adjustment part and the rotational adjustment part. In using the calibration object 42 illustrated in FIG. 8(a), first, as indicated by an arrow in the figure, the one end adjustment part in the shape of a circle is shifted to one end portion of the index 41. FIG. 8(b) illustrates a state when the one end portion of the index 41 roughly overlaps the one end adjustment part of the calibration object 42. Then, the calibration object 42 is rotated as illustrated by an arrow in FIG. 8(b) until the entire index 41 except for the end portion thereof roughly overlaps the rotational adjustment part of the calibration object 42. At this time, rotating about a center point of the one end adjustment part enables to prevent displacement of the calibration object 42 from the index 41 caused by the rotation. Accordingly, since there is no need to finely adjust the calibration object 42 by shifting in the vertical and horizontal directions after rotation, the time for adjustment may be shortened.

Note that, in the present specification, when a part of the index and a part of the calibration object "meet" includes a case when one of them accommodate the other when the index and the calibration object are in different sizes. Similarly, when all or a part of the index and all or a part of the calibration object "overlap" includes a case when one of them accommodate the other when the index and the calibration object are in different widths.

Figure 9:
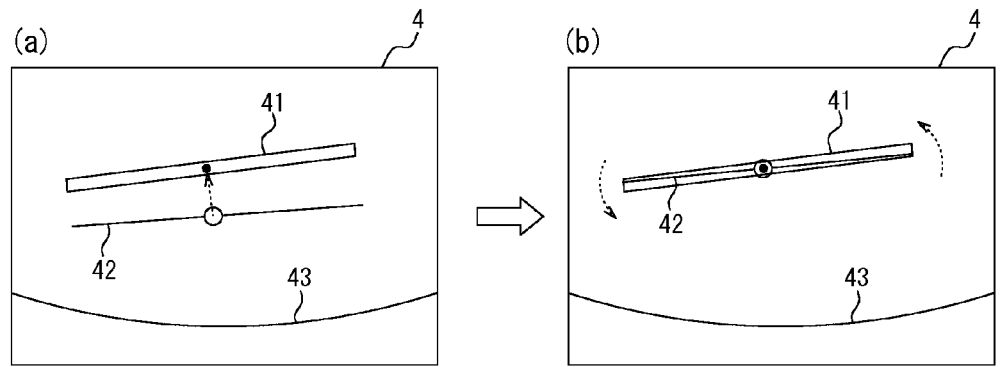
FIGS. 9(a) and (b) are diagrams illustrating an example of a calibration object when an index has a marker.

FIG. 9 is a diagram illustrating an example of the calibration object 42 when the index 41 has a marker. The index 41 having a marker, as illustrated in FIG. 9(a), enables to use the calibration object 42 having a marker adjustment part and the rotation adjustment part. As indicated by an arrow in FIG. 9(a), first, the marker adjustment part of the calibration object 42 in a round shape is shifted to the index 41. FIG. 9(b) illustrates a state when the marker of the index 41 roughly meets the marker adjustment part of the calibration object 42. Then, the calibration object 42 is rotated as indicated by arrows in FIG. 9(b) until the entire index 41 except for the marker roughly overlaps the rotation adjustment part of the calibration object 42. At this time, rotating about a center point of the marker enables to prevent displacement of the calibration object 42 from the index 41 caused by the rotation. Accordingly, since there is no need to finely adjust the calibration object 42 by shifting in the vertical and horizontal directions after rotation, the time for adjustment may be shortened.

Figure 10:
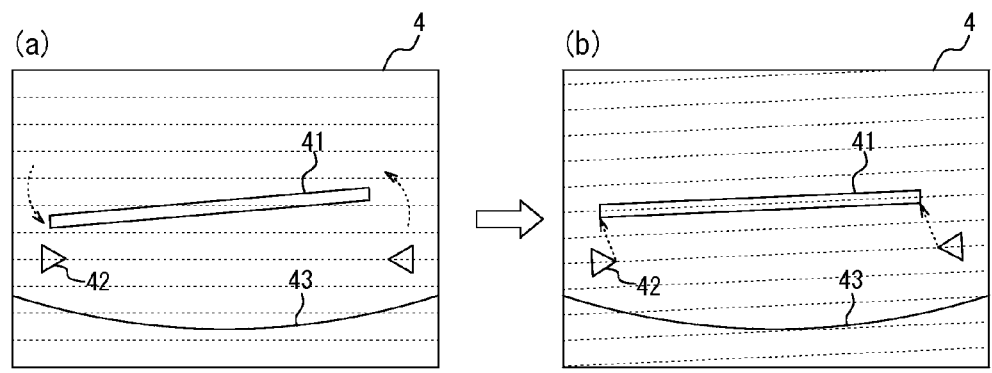
FIGS. 10(a) and (b) are diagrams illustrating an example of a calibration object having both end adjustment parts and the calibrations for adjustment of a rotation axis.

FIG. 10 is a diagram illustrating an example of the calibration object 42 having both end adjustment parts and a plurality of parallel calibration lines for adjustment of a rotation axis. In using the calibration object 42 illustrated in FIG. 10(a), first, as indicated by arrows in FIG. 10(a), the calibration lines of the calibration object 42 is rotated until any of the calibration lines becomes parallel to the index 41. At this time, the calibration object 42 rotates together with the calibration lines. FIG. 10(b) illustrates a state when the index 41 is approximately parallel to one of the calibration lines of the calibration object 42. Then, as indicated by arrows in FIG. 10(b), the calibration object 42 is shifted to the upper left until the both end adjustment parts of the calibration object 42 roughly meet both ends of the index 41. Accordingly, since there is no need to rotate the calibration object 42 after shifting in the vertical and horizontal directions, the time for adjustment may be shortened.

Figure 11:
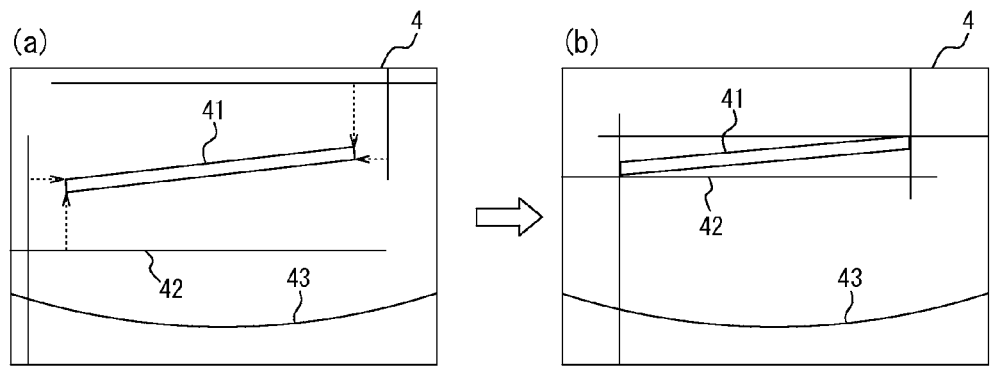
FIGS. 11(a) and (b) are diagrams illustrating an example of a calibration object having an upper line, a lower line, a left line and a right line.

FIG. 11 is a diagram illustrating an example of the calibration object 42 having an upper line, a lower line, a left line and a right line. In using the calibration object 42 illustrated in FIG. 11(a), first, as indicated by arrows in FIG. 11(a), the upper line, the lower line, the left line and the right line are preliminarily displayed at four edges. Then, the upper line, the lower line, the left line and the right line are separately shifted such that the index 41 fits in an area surrounded by all of these lines. FIG. 11(b) illustrates a state when the index 41 fits in the area surrounded by the upper line, the lower line, the left line and the right line of the calibration object 42. When the index 41 is fit in the area surrounded by the upper line, the lower line, the left line and the right line of the calibration object 42, positions of two corners of the index 41 are determined. Therefore, it is not necessary to rotate the calibration object 42, which shortens the time for adjustment. At this time, it is necessary to separately instruct inclination of the index 41, downward or upward to the right. Such inclination may be directly input or specified by defining one end of the index 41 on the left side on the display with the lower line and the left line and the other end with the upper line and the right line.

FIG. 12 is a flowchart illustrating an operation of the CPU 124 in calibration operation of the camera 11. When the CPU 124 receives the object shift signal from the instruction unit 5 (Yes at step S201), the CPU 124 instructs the image superimposing unit 122 to superimpose the image (step S202). When the CPU 124 does not receive the object shift signal from the instruction unit 5 (No at step S201), the CPU 124 waits for the shift instruction from the instruction unit 5 until receiving a calibration end signal from the instruction unit 5 (No at step S203). Upon receiving an adjustment end signal from the instruction unit 5 (Yes at step S203), the CPU 124 calculates the calibration parameters (a pan angle, a tilt angle and a roll angle) (step S204).

Figure 13:
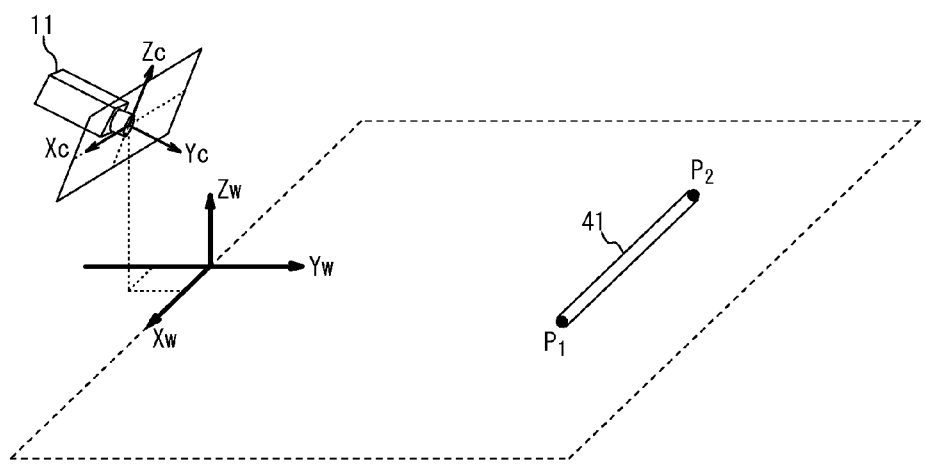
FIG. 13 is a diagram illustrating a calibration parameter calculation method in calibration operation of the camera by the camera system according to one embodiment of the present invention.

Next, a calibration parameter calculation method at step S204 will be described. FIG. 13 is a diagram illustrating the calibration parameter calculation method and indicates a positional relationship between the camera 11 mounted on the movable object 100 and the index 41. Two ends of the index 41 are denoted by $P_1$ and $P_2$, respectively. A position of the camera 11 (an origin of a camera coordinate) is represented by (tx, ty, tz) in the world coordinate. With the position of the camera 11 as a reference, a relative positional relationship viewed from the camera 11 may be represented in a camera coordinate system. The camera coordinate system may be represented by a parallel translation or rotational translation relative to the world coordinate system.

Figure 14:
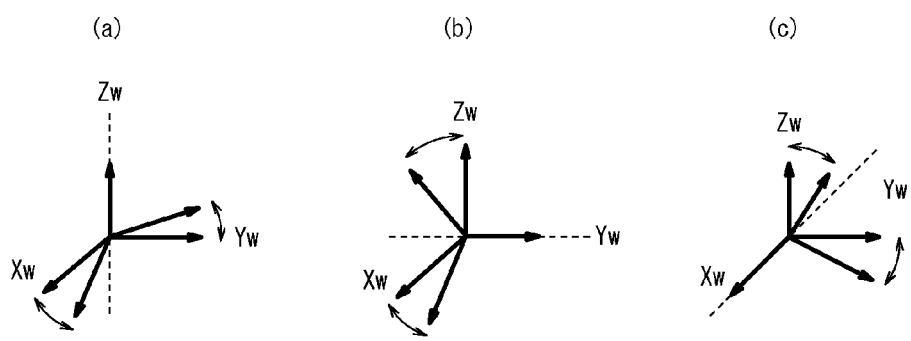
FIG. 14(a)-(c) are diagrams illustrating rotations in a world coordinate system.

FIG. 14 is a diagram illustrating rotational translation in the world coordinate system. A rotation about Zw as illustrated in FIG. 14(a) is referred to as the pan, a rotation about Yw as illustrated in FIG. 14(b) is referred to as the roll, and a rotation about Xw as illustrated in FIG. 14(c) is referred to as the tilt. Provided that $\alpha$, $\beta$ and $\gamma$ represent a rotation angle of the pan (pan angle), a rotation angle of the roll (roll angle) and a rotation angle of the tilt (tilt angle), respectively, $P_1$ represented by a coordinate $(xw_1, yw_1, zw_1)$ in the world coordinate system may be represented by Formula (1) in the camera coordinate system.

[Formula 1]

$$\begin{bmatrix} xc_1 \\ yc_1 \\ zc_1 \\ 1 \end{bmatrix} = \begin{bmatrix} \cos\alpha & -\sin\alpha & 0 & 0 \\ \sin\alpha & \cos\alpha & 0 & 0 \\ 0 & 0 & 1 & 0 \\ 0 & 0 & 0 & 1 \end{bmatrix} \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix}$$

$$\begin{bmatrix} 1 & 0 & 0 & 0 \\ 0 & \cos\gamma & -\sin\gamma & 0 \\ 0 & \sin\gamma & \cos\gamma & 0 \\ 0 & 0 & 0 & 1 \end{bmatrix} \begin{bmatrix} 1 & 0 & 0 & -tx \\ 0 & 1 & 0 & -ty \\ 0 & 0 & 1 & -tz \\ 0 & 0 & 0 & 1 \end{bmatrix} \begin{bmatrix} xw_1 \\ yw_1 \\ zw_1 \\ 1 \end{bmatrix} \quad (1)$$

Figure 15:
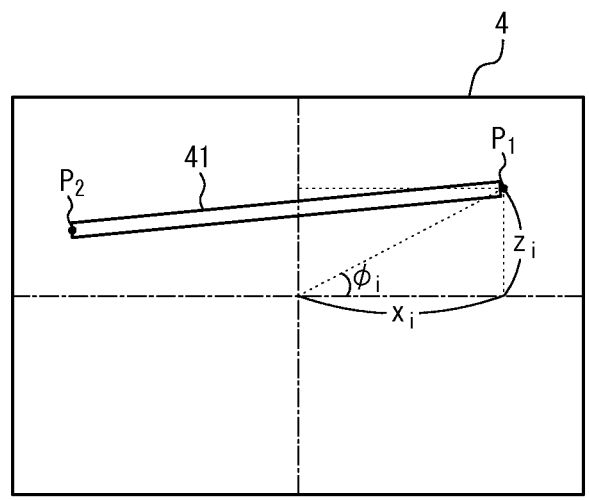
FIG. 15 is a diagram illustrating a camera image by the camera system according to one embodiment of the present invention.

FIG. 15 is a diagram illustrating coordinates of the index 41 in a camera image. The coordinates of the index 41 may be obtained by shifting the calibration object as described above. Provided that a position of $P_1$ at the end of the index 41 is represented by $(x_i, z_i)$ in a coordinate having a center point of the camera image as the origin, an image height h on a sensor surface of the camera 11 may be calculated from Formula (2) using a sensor pixel pitch d.

[Formula 2]

$$h = \sqrt{x_i^2 + z_i^2} \times d \quad (2)$$

Further, a relationship between an incident angle $\theta_i$ on a lens and the image height h on the sensor surface may be represented by Formula (3) using a focal length f and distortion dist of the lens.

[Formula 3]

$$h = f \tan \theta_i (1 + \text{dist}) \quad (3)$$

Figure 16:
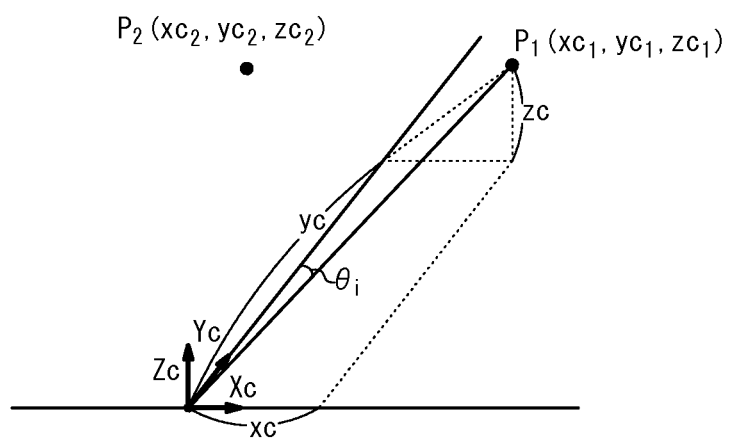
FIG. 16 is a diagram illustrating coordinates of both ends of the index in a camera coordinate system.

FIG. 16 is a diagram illustrating coordinates of the both ends $P_1$ and $P_2$ of the index 41 in the camera coordinate system. The incident angle $\theta_i$ on the camera 11 relative to the point $P_1$ may be calculated from Formula (4).

[Formula 4]

$$\theta_i = \tan^{-1} \frac{\sqrt{xc^2 + zc^2}}{yc} \quad (4)$$

Since a distance s between the camera 11 and the point $P_1$, that is, a distance between the origin and the point $P_1$ of the index 41 in the camera coordinate is known, $(xc_1, yc_1, zc_1)$ may be calculated from Formulas (6), (7) and (8) using the angle $\theta_i$ obtained from Formulas (2) and (3), and the angle $\phi_i$ calculated from Formula (5).

[Formula 5]

$$\phi_i = \tan^{-1} \frac{z_i}{x_i} \quad (5)$$

$$yc_1 = s \cdot \cos\theta_i \quad (6)$$

$$xc_1 = s \cdot \sin\theta_i \cdot \cos\phi_i \quad (7)$$

$$zc_1 = s \cdot \sin\theta_i \cdot \sin\phi_i \quad (8)$$

Similarly, the point $P_2$ is calculated from Formula (9).

[Formula 6]

$$\begin{bmatrix} xc_2 \\ yc_2 \\ zc_2 \\ 1 \end{bmatrix} = \begin{bmatrix} \cos\alpha & -\sin\alpha & 0 & 0 \\ \sin\alpha & \cos\alpha & 0 & 0 \\ 0 & 0 & 1 & 0 \\ 0 & 0 & 0 & 1 \end{bmatrix} \begin{bmatrix} \cos\beta & 0 & \sin\beta & 0 \\ 0 & 1 & 0 & 0 \\ -\sin\beta & 0 & \cos\beta & 0 \\ 0 & 0 & 0 & 1 \end{bmatrix} \quad (9)$$

$$\begin{bmatrix} 1 & 0 & 0 & 0 \\ 0 & \cos\gamma & -\sin\gamma & 0 \\ 0 & \sin\gamma & \cos\gamma & 0 \\ 0 & 0 & 0 & 1 \end{bmatrix} \begin{bmatrix} 1 & 0 & 0 & -tx \\ 0 & 1 & 0 & -ty \\ 0 & 0 & 1 & -tz \\ 0 & 0 & 0 & 1 \end{bmatrix} \begin{bmatrix} xw_2 \\ yw_2 \\ zw_2 \\ 1 \end{bmatrix}$$

When the index 41 is disposed parallel to the rear end of the movable object 100 at a position with a predetermined distance from the rear end of the movable object 100 and has an even thickness, the following equalities (10) and (11) are true.

$$yw_1 = yw_2 \quad (10)$$

$$zw_1 = zw_2 \quad (11)$$

Since coordinates of calibration points in the world coordinate system are known, when coordinates of two calibration points on the image input by a calibration instruction apparatus are determined, the pan angle $\alpha$, the roll angle $\beta$ and the tilt angle $\gamma$ may be calculated from Formulas (1), (9), (10) and (11). That is, the CPU 124 may calculate the calibration parameters by obtaining two coordinates of the calibration object by satisfying the equalities (10) and (11).

The image taken by the camera 11, after calculation of the calibration parameters by the CPU 124, is output being offset by an amount corresponding to the calibration parameters. As a result, when the image superimposing unit 122 generates the superimposed image by superimposing the image of the predicted track or the like on the digital image generated by the image processing unit 121, the predicted track or the like is superimposed offset from its superimposing position prior to calculation of the calibration parameters. Therefore, a highly accurate predicted vehicle track may be displayed in parking, for example.

As described above, according to the calibration operation device 12, the camera calibration device 10, the camera system 1 and the camera calibration method of the present invention, the calibration object 42 in a first embodiment has calibrations for indicating the approximate shift amount. The calibration object 42 in a second embodiment has the one end adjustment part and the other end adjustment part having the markers at predetermined intervals. The calibration object 42 in a third embodiment has the one end adjustment part and the rotation adjustment part. The calibration object 42 in a fourth embodiment has the marker adjustment part and the rotation adjustment part. The calibration object 42 in a fifth embodiment has the both end adjustment parts and the calibrations for adjusting the rotation axis. The calibration object 42 in a sixth embodiment has the upper line, the lower line, the left line and the right line which are separately movable. According to the calibration operation device 12, the camera calibration device 10, the camera system 1 and the camera calibration method, since the calibration object 42 is elaborately shaped as described above, the calibration operation of the camera 11 may be simplified and the time necessary for calibration may be shortened.

Note that the above embodiments are described as representative examples and those who are skilled in the art may make an alteration or replacement within a spirit and a scope of the present invention. Accordingly, it is appreciated that the present invention is not limited to the above embodiments but may be varied or altered in a multiple manner without departing from a scope of claims. For example, although two coordinates, the left end and the right end of the index 41, are obtained in the above embodiments, coordinates of any predetermined points on the index 41 may be obtained.

EXPLANATION OF REFERENCE NUMERALS

1 Camera System
2 CPU
3 Bus
4 Display unit
5 Instruction Unit
6 Sensor
10 Camera Calibration Device
11 Camera
12 Calibration Operation Device
121 Image Processing Unit
122 Image Superimposing Unit
123 Image Output Unit
124 CPU
125 Storage Unit
41 Index
42 Calibration Object
43 Bumper
100 Movable Object

What is claimed is:

1. A camera device comprising:
a camera mounted on a predetermined position of a movable object and configured to take an image including an index disposed outside the movable object;
an image superimposing unit configured to generate a superimposed image by superimposing a calibration object having a position adjustment part and a rotation adjustment part on the image taken by the camera; and
a calculation unit configured to calculate, based on a position of the calibration object after being shifted in the superimposed image such that an end or a center of the index meets the position adjustment part and a part of the index other than the end or the center overlaps the rotation adjustment part, parameters relative to a pan angle, a tilt angle and a roll angle for calibration of a camera mounting position.

2. The camera device according to claim 1, wherein the calculation unit, when an instruction to shift the calibration object in horizontal, vertical and rotational directions is detected, shifts a display position of the calibration object on the superimposed image according to the instruction.

3. The camera device according to claim 1, wherein the position adjustment part has a circular shape.

4. The camera device according to claim 1, wherein the rotation adjustment part includes a plurality of parallel lines adjacent to the position adjustment part.

5. The camera device according to claim 1, wherein the calculation unit controls to display the image taken by the camera at least when a parking mode is selected and when a camera calibration mode is selected.

6. The camera device according to claim 5, wherein the calculation unit, when the camera calibration mode is selected, controls the image superimposing unit to superimpose the calibration object on the image taken by the camera.

7. The camera device according to claim 6, wherein the calculation unit, when the parking mode is selected, controls the image superimposing unit to superimpose a predicted track of the movable object on the image taken by the camera.

8. The camera device according to claim 1, wherein a marker is provided on the center of the index and the calibration object is shifted such that the position adjustment part meets the marker.

9. A camera device comprising:
a camera mounted on a predetermined position of a movable object and configured to take an image including an index provided outside the movable object;
an image superimposing unit configured to generate a superimposed image by superimposing a calibration object having calibrations for a rough indication of a shift amount on the image taken by the camera; and
a calculation unit configured to calculate, based on a position of the calibration object after being shifted in the superimposed image such that the index and all or a part of the calibration object roughly overlap with each other, parameters relative to a pan angle, a tilt angle and a roll angle for calibration of a camera mounting position.

10. The camera device according to claim 9, wherein intervals of the calibrations of the calibration object correspond to a shift amount by predetermined times of operations to shift the calibration object.

11. A camera device comprising:
a camera mounted on a predetermined position of a movable object and configured to take an image including an index provided outside the movable object;
an image superimposing unit configured to generate a superimposed image by superimposing a calibration object having one end adjustment part and the other end adjustment part having markers with a predetermined width on the image taken by the camera; and
a calculation unit configured to calculate, based on a position of the calibration object after being shifted in the superimposed image such that one end and the other end of the index respectively fall within the predetermined width of the marker of the one end adjustment part and the other end adjustment part, parameters relative to a pan angle, a tilt angle and a roll angle for calibration of a camera mounting position.

12. A camera device comprising:
a camera mounted on a predetermined position of a movable object and configured to take an image including an index provided outside the movable object;
an image superimposing unit configured to generate a superimposed image by superimposing a calibration object having both end adjustment parts and calibrations for adjusting a rotation axis on the image taken by the camera; and
a calculation unit configured to calculate, based on a position of the calibration object after being shifted in the superimposed image such that, after the index and the calibrations become roughly parallel to one another, each end of the index roughly meets the respective both end adjustment parts, parameters relative to a pan angle, a tilt angle and a roll angle for calibration of a camera mounting position.

13. A camera device comprising:
a camera mounted on a predetermined position of a movable object and configured to take an image including an index provided outside the movable object;
an image superimposing unit configured to generate a superimposed image by superimposing a calibration object having an upper line, a lower line, a left line and a right line on the image taken by the camera; and
a calculation unit configured to calculate, based on a position of the calibration object when the upper line, the lower line, the left line and the right line are separately shifted such that the index fits in an area surrounded by the upper line, the lower line, the left line and the right line, parameters relative to a pan angle, a tilt angle and a roll angle for calibration of a camera mounting position.

14. A camera calibration method comprising:
a step to take an image including an index provided outside a movable object by a camera mounted on a predetermined position of the movable object;
a step to generate a superimposed image by superimposing a calibration object having a position adjustment part and a rotation adjustment part on the image taken by the camera; and
a step to calculate, based on a position of the calibration object after being shifted in the superimposed image such that an end or a center of the index meets the position adjustment part and a part other than the end or the center of the index overlaps the rotation adjustment part, parameters relative to a pan angle, a tilt angle and a roll angle for calibration of a camera mounting position.

15. A camera system comprising:
a camera mounted on a predetermined position of a movable object and configured to take an image including an index provided outside the movable object;
an image superimposing unit configured to generate a superimposed image by superimposing a calibration object having a position adjustment part and a rotation adjustment part on the image taken by the camera;

a display unit provided inside the movable object and configured to display the superimposed image;

an instruction unit configured to instruct the calibration object to shift a display position of the calibration object on the superimposed image; and a calculation unit configured to calculate, based on the position of the calibration object when an end or a center of the index meets the position adjustment part and a part other than the end or the center of the index overlaps the rotation adjustment part, parameters relative to a pan angle, a tilt angle and a roll angle for calibration of a camera mounting position.

* * * * *